(12) United States Patent
Karmanenko et al.

(10) Patent No.: US 8,042,033 B2
(45) Date of Patent: Oct. 18, 2011

(54) PROTECTION OF ACCESS INFORMATION IN WIRELESS COMMUNICATIONS

(75) Inventors: Sergey Karmanenko, St. Petersburg (RU); Patrick Fischer, Paris (FR)

(73) Assignee: LG Electronics Inc., Seoul (KR)

( * ) Notice: Subject to any disclaimer, the term of this patent is extended or adjusted under 35 U.S.C. 154(b) by 1114 days.

(21) Appl. No.: 11/772,762

(22) Filed: Jul. 2, 2007

(65) Prior Publication Data

US 2008/0125043 A1 May 29, 2008

Related U.S. Application Data

(60) Provisional application No. 60/867,775, filed on Nov. 29, 2006.

(51) Int. Cl.
*H04L 9/00* (2006.01)

(52) U.S. Cl. .............................. 714/807; 714/819; 726/4

(58) Field of Classification Search .................. 714/807, 714/819; 726/4
See application file for complete search history.

(56) References Cited

U.S. PATENT DOCUMENTS

| | | | |
|---|---|---|---|
| 7,009,940 B2 * | 3/2006 | Vialen et al. | 370/252 |
| 7,366,496 B2 * | 4/2008 | Vialen et al. | 455/410 |
| 7,743,408 B2 * | 6/2010 | Aboba et al. | 726/4 |
| 7,882,545 B2 * | 2/2011 | Adiletta et al. | 726/4 |

* cited by examiner

*Primary Examiner* — Stephen Baker
(74) *Attorney, Agent, or Firm* — Lee, Hong, Degerman, Kang & Waimey

(57) ABSTRACT

Protection of access information in wireless communications is achieved by transmitting access information related to configuration to a terminal, receiving a result of a countermeasure procedure performed by the terminal, deciding whether the configuration is correct or not based on the received result, and if not correct, allowing the terminal to receive access information, or if correct, performing the configuration.

22 Claims, 7 Drawing Sheets

US 8,042,033 B2

PROTECTION OF ACCESS INFORMATION IN WIRELESS COMMUNICATIONS

CROSS-REFERENCE TO RELATED APPLICATIONS

This application claims the priority benefit of U.S. provisional application No. 60/867,775 filed on Nov. 29, 2006, which is hereby incorporated by reference.

BACKGROUND

The disclosed and claimed concepts relate to protection of access information in wireless communications.

The present inventors recognized certain problems related to protection of access information in wireless communications. Based upon such recognition, the following features have been conceived.

BRIEF DESCRIPTION

The features and aspects of the present invention have been proposed to improve the protection of access information (i.e., system information) in wireless communications by employing various countermeasures that authorize proper configuration between the network and the mobile terminal.

DETAILED DESCRIPTION

Figure 1:
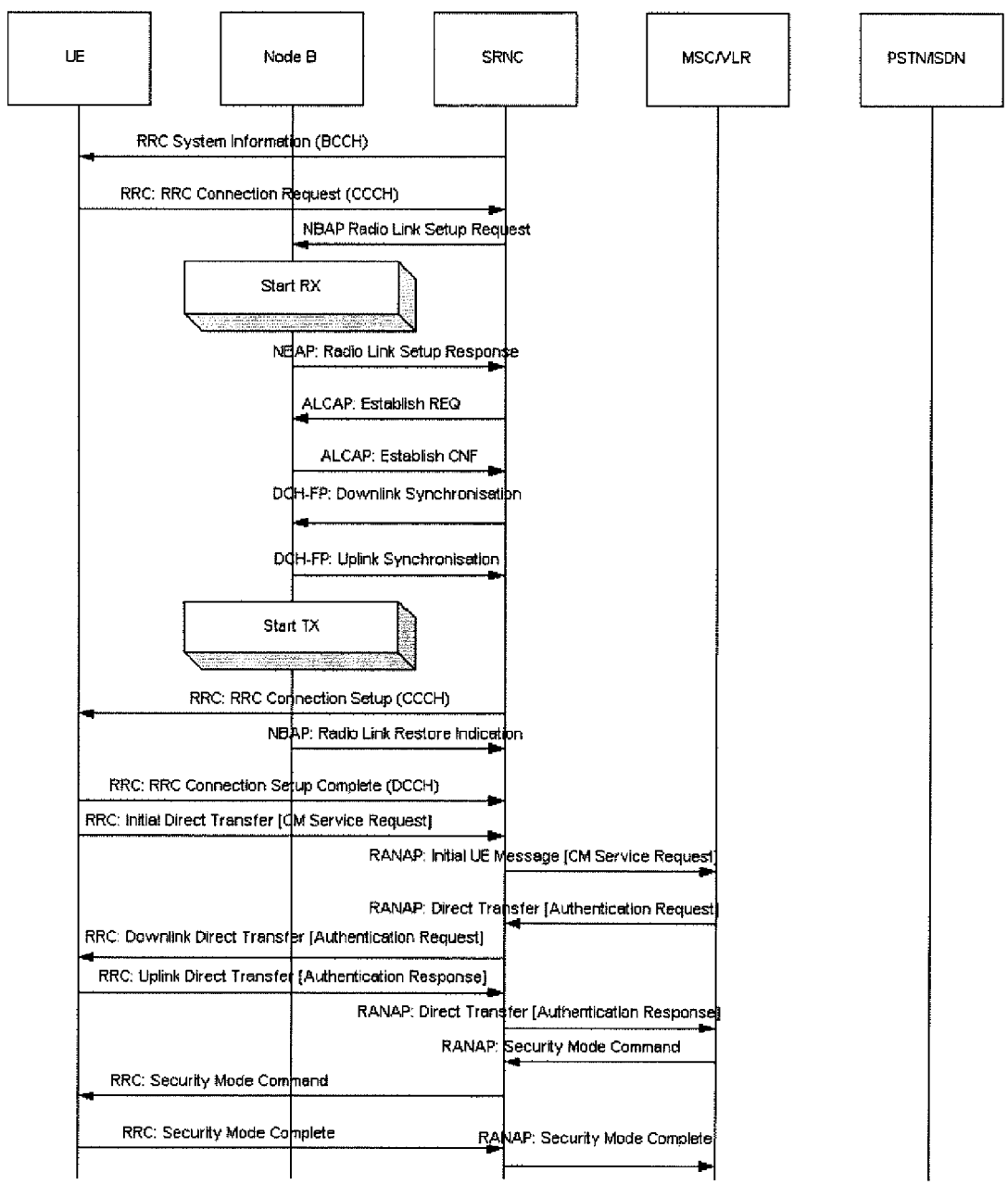
FIG. 1 shows an example of a messages flow for connection establishment before the Security Mode Command.

The features and aspects described herein may be implemented in various types of radio (wireless) communication systems that include a network (e.g., a UTRAN, etc.) and mobile terminals (e.g., user equipment (UE), wireless communication devices, etc.). Although some possible threats related to broadcast and multicast in SAE/LTE that might affect the design of communication systems and networks are identified and possible solutions therefor are proposed herein, the inventive concepts would also be applicable and can be implemented in various other types of radio communication schemes.

During the registration procedure in mobile network, a user equipment receives a set of system information (for example predefined network configuration), which it should subsequently use to establish a connection. This information is broadcast on a regular basis and is unprotected by the network, which thus may invite unwanted attackers and intruders.

The possible attackers/intruders are hackers, operator's own personnel, third parties having access to the system, competing operators, competing vendors, criminals, ordinary subscribers (deliberately or non-deliberately), spies, etc. Motivations of attackers/intruders are espionage, violating operator's business or reputation, getting information about operators' system, business or services, just for fun, financial benefit, by mistake, to cover illegal actions, vandalism, to avoid charging, etc.

During the registration procedure, a presumable attacker can broadcast a set of system information (i.e., access information) to the user before the network, thus the user will apply this information and later he can not establish connection due to because the system information parameters are wrong. The subject of this patent description is to describe various types of countermeasures or other schemes which can mitigate this threat.

Here, it can be understood that the type(s) of access information would depend upon the type of radio communication system and protocols used thereof. For example, the access information may include control signals (or information) for a mobile terminal, which may be comprised of a preamble, FCH, DL/UL-MAP, D/UCD, etc. The details regarding the DL-MAP message and UL-MAP message, which may be part of the access information, can be found in IEEE Std 802/16e (6.3.2.3.2 and 6.3.2.3.4).

RRC Connection Establishment

In a radio communications network (e.g., a UTRAN) there is no protection of information received from the network before the Security Mode Command procedure is performed. That means that bootstrap information and information which is sent from the network in a point-to-multipoint fashion, e.g. information triggering hand-over to other NodeBs while the UE is in idle state or broadcasts of system information are unprotected. The threats associated with these lacks of protection are mainly related to DoS (Denial of Service) aspects, i.e. the UE can be fooled into camping on a false NodeB or the UE can be detached from the network.

FIG. 1 shows an example of a messages flow for connection establishment before the Security Mode Command.

Some exemplary RRC messages employed before the Security Mode Command, according to the FIG. 1 may include the following:

System Information (BCCH): The UE reads the System Information that is broadcast on BCCH. The information is not read continuously. It is only read if the information changes.

RRC Connection Request (CCCH): The Mobile user decides to initiate a voice call. The first message the UE will send on CCCH is RRC Connection Request. This will contain, among other things, Initial UE Identity and Establishment Cause.

RRC Connection Setup (CCCH): RRC Connection Setup message is sent on CCCH with the parameters required to establish DCH. Also the state indicator will be set to DCH for the voice (or CS) call.

RRC Connection Setup Complete (DCCH): RRC Connection Setup complete will be sent on DCCH. Integrity and Ciphering related parameters and UE capability information will be sent back to SRNC.

Initial Direct Transfer [CM Service Request]: First NAS message is now sent by the UE. It indicates that a UE orginated Voice call is required. The UE identity.

Downlink Direct Transfer [Authentication Request]: SRNC transfers the NAS message to the UE.

Uplink Direct Transfer [Authentication Response]: UE computes the response (RES) and sends it back in the NAS message Security Mode Command: RRC Forwards the Security Mode command received from MSC/VLR to the UE.

Security Mode Complete: The UE configures the Ciphering and Integrity Protection and responds back to the network. The response message is Integrity Protected for further safety. Ciphering is started at Ciphering activation time. Since this is a Circuit switched call, the Ciphering will be started in MAC. In case of AM and UM bearers it is started in RLC.

The UMTS RRC protocol is specified in 3GPP Technical Specification 25.331 and other related sections.

The UMTS Security architecture, i.e. Authentication and Key Agreement (AKA) mechanism, security mode set-up procedure, mechanisms for access link data integrity and confidentiality are specified in 3GPP Technical Specification 33.102 and other related sections.

Broadcast of System (Access) Information

The purpose of this procedure is to broadcast system (access) information from the UTRAN to UEs in a cell. The system information elements are broadcast in system information blocks (SIBs). A system information block groups together system information elements of the same nature. Different system information blocks may have different characteristics, e.g. regarding their repetition rate and the requirements on UEs to re-read the system information blocks.

The system (access) information is may be organised as a tree (or some other logical hierarchy structure). A master information block (MIB) gives references and scheduling information to a number of system information blocks in a cell. The system information blocks contain the actual system information. The master information block may optionally also contain reference and scheduling information to one or two scheduling blocks, which give references and scheduling information for additional system information blocks. Scheduling information for a system information block may only be included in either the master information block or one of the scheduling blocks.

For all system information blocks, except System Information Block types 15.2, 15.3 and 16, the content is the same in each occurrence for system information blocks using value tag. System Information Block types 15.2, 15.3 and 16 may occur more than once with different content. In this case, scheduling information is provided for each such occurrence of the system information block. System information blocks that do not use value tag may have different content for each occurrence.

The area scope specifies the area where a system information block's value tag is valid. If the area scope is cell, the UE shall consider the system information block to be valid only in the cell in which it was read. If system information blocks have been previously stored for this cell, the UE shall check whether the value tag for the system information block in the entered cell is different compared to the stored value tag. If the area scope is PLMN or Equivalent PLMN, the UE shall check the value tag for the system information block when a new cell is selected. If the value tag for the system information block in the new cell is different compared to the value tag for the system information block stored in the UE, the UE shall re-read the system information block. If the area scope is PLMN, the UE shall consider the system information block to be valid only within the PLMN in which it was read. If the area scope is Equivalent PLMN, the UE shall consider the system information block to be valid within the PLMN in which it was received and all PLMNs which are indicated by higher layers to be equivalent.

For System information block types 15.2, 15.3 and 16, which may have multiple occurrences, each occurrence has its own independent value tag. The UE- shall re-read a particular occurrence if the value tag of this occurrence has changed compared to that stored in the UE.

Scheduling of system information blocks may be performed by the RRC layer in UTRAN. If segmentation is used, it should be possible to schedule each segment separately. To allow the mixing of system information blocks with short repetition period and system information blocks with segmentation over many frames, UTRAN may multiplex segments from different system information blocks. Multiplexing and de-multiplexing may be performed by the RRC layer. The scheduling of each system information block broadcast on a BCH transport channel is defined by the number of parameters.

The system information is continuously broadcast on a regular basis in accordance with the scheduling defined for each system information block.

Reception of SYSTEM INFORMATION Messages by the UE

The UE shall read SYSTEM INFORMATION messages broadcast on a BCH transport channel in idle mode and in the connected mode in states CELL_FACH, CELL_PCH, URA_PCH and CELL_DCH (TDD only). In addition, UEs in FDD mode which support simultaneous reception of one SCCPCH and one DPCH shall read system information on a FACH transport channel when in CELL_DCH state.

The UE may store system information blocks with cell, PLMN or Equivalent PLMN area scope (including their value tag if applicable) for different cells and different PLMNs, to be used if the UE returns to these cells.

The UE shall consider all stored system information blocks as invalid after it has been switched off. Some information obtained from system information may be stored by the UE or in the USIM for use in a stored information cell selection.

When selecting a new cell the UE shall consider all current system information blocks with area scope cell to be invalid. If the UE has stored valid system information blocks for the newly selected cell, the UE may set those as current system information blocks.

After selecting a new cell and this cell broadcasts an IE (information element) "PLMN Identity" in the MIB which is different from the IE "PLMN Identity" broadcast in the MIB in the previously selected cell, the UE shall consider all current system information blocks with area scope PLMN to be invalid. If the UE has previously stored valid system information blocks for the selected cell of the new PLMN, the UE may set those as current system information blocks. When NAS informs AS about a new selected PLMN, the UE shall consider all stored system information blocks with area scope Equivalent PLMN to be invalid.

Upon modifications of system information blocks using value tags, UTRAN should notify the new value tag for the master information block in the IE "BCCH modification info", which may be transmitted in the following way:

1) to reach UEs in idle mode, CELL_PCH state and URA_PCH state, the IE "BCCH modification info" is contained in a PAGING TYPE 1 message transmitted on the PCCH in all paging occasions in the cell;

2) to reach UEs in CELL_FACH state or TDD UEs in CELL_DCH with S-CCPCH assigned, the IE "BCCH modification info" is contained in a SYSTEM INFORMATION CHANGE INDICATION message transmitted on the BCCH mapped on at least one FACH on every Secondary CCPCH in the cell.

Upon reception of a PAGING TYPE 1 message or a SYSTEM INFORMATION CHANGE INDICATION message containing the IE "BCCH modification info" containing the IE "MIB value tag" but not containing the IE "BCCH modification time", the UE shall compare the value of IE "MIB value tag" in the IE "BCCH modification info" with the value tag stored for the master information block in variable VALUE_TAG.

If the value tags differ, the UE shall read the master information block on BCH; if the value tag of the master information block in the system information is the same as the value in IE "MIB value tag" in "BCCH modification info" but different from the value tag stored in the variable VALUE_TAG, the UE shall perform actions as described in 3GPP TS 25.331 v.7.0.0 Radio Resource Control (RRC) protocol specification.

Actions Upon Receiving of Master Information Blocks, Scheduling Blocks and System Information Blocks When selecting a new cell, the UE shall read the master information block. The UE may use the pre-defined scheduling information to locate the master information block in the cell. Upon reception of the master information block, for all system information blocks or scheduling blocks that are supported by the UE referenced in the master information block or the scheduling blocks, the UE shall perform the following actions:
1> for all system information blocks with area scope "PLMN" or "Equivalent PLMN" that use value tags:
  2> compare the value tag read in scheduling information for that system information block with the value stored within the variable VALUE_TAG for that system information block;
  2> if the value tags differ, or if no IEs for the corresponding system information block are stored:
    3> store the value tag read in scheduling information for that system information block into the variable VALUE_TAG;
    3> read and store the IEs of that system information block.
  2> if the value tags are the same the UE may use stored system information blocks using value tag that were stored in this PLMN as valid system information.
1> for all system information blocks or scheduling blocks with area scope cell that use value tags:
  2> compare the value tag read in scheduling information for that system information block or scheduling block with the value stored within the variable VALUE_TAG for that system information block or scheduling block;
  2> if the value tags differ, or if no IEs for the corresponding system information block or scheduling block are stored:
    3> store the value tag read in scheduling information for that system information block or scheduling block into the variable VALUE_TAG;
    3> read and store the IEs of that system information block or scheduling block.
  2> if the value tags are the same the UE may use stored system information blocks using value tags that were stored for this cell and this PLMN as valid system information.
1> for system information blocks which may have multiple occurrences:
  2> compare the value tag and the configuration or multiple occurrence identity for the occurrence of the system information blocks read in scheduling information with the value tag and configuration or multiple occurrence identity stored within the variable VALUE_TAG:
    3> if the value tags differ, or if no IEs from the occurrence with that configuration or multiple occurrence identity of the system information block are stored:
      4> store the value tag read in scheduling information for that system information block and the occurrence with that configuration or multiple occurrence identity into the variable VALUE_TAG;
      4> read and store the IEs of that system information block.
    3> if the value tags and the configuration or multiple occurrence identity are identical to those stored, the UE may use stored occurrences of system information blocks that were stored for this cell and this PLMN as valid system information.

Detailed actions for UE upon receiving system information blocks, including system information blocks which are not supported by the UE and system information blocks which are located at positions different from its position according to the scheduling information, are specified in RRC Protocol Specification of the 3GPP standards.

System Information Block Type 16

Network predefined (default) configurations are broadcast in System Information Blocks type 16. For System Information Block type 16 multiple occurrences may be used; one occurrence for each predefined configuration. To identify the different predefined configurations, the scheduling information for System Information Block type 16 includes IE "Predefined configuration identity and value tag". The UE should store all relevant IEs included in this system information block. The UE shall:
1> compare for each predefined configuration the value tag of the stored predefined configuration with the preconfiguration value tag included in the IE "Predefined configuration identity and value tag" for the occurrence of the System Information Block with the same predefined configuration identity;
1> in case the UE has no predefined configuration stored with the same identity:
  2> store the predefined configuration information together with its identity and value tag for later use e.g. during handover to UTRAN.
1> in case a predefined configuration with the same identity but different value tag was stored:
  2> overwrite this one with the new configuration read via system information for later use e.g. during handover to UTRAN.

The UE is not required to complete reading of all occurrences of System Information Block type 16 before initiating RRC connection establishment. The system information block type 16 contains radio bearer, transport channel and physical channel parameters to be stored by UE in idle and connected mode for use during handover to UTRAN. The structure of System Information Block is as follows:
1. Predefined RB configuration—This information element concerns a predefined configuration of radio bearer parameters
  a) UE information elements
    i) Re-establishment timer—This information element indicates which timer to associate with RAB.
  b) Signalling radio bearer information to setup
    i) RB Identity—An identification number for the RB affected by a certain message.
    ii) RLC Info
      (1) CHOICE UL RLC mode (AM RLC, UM RLC, TM RLC)
      (2) CHOICE DL RLC mode (AM RLC, UM RLC, TM RLC)
      (3) RB Mapping Info—A multiplexing option for each possible transport channel this RB can be multiplexed on.

c) RB information to setup
   i) RB identity
   ii) PDCP info
   iii) CHOICE RLC info type
   iv) RB mapping info
2. Predefined Transport Channel configuration—This information element concerns a predefined configuration of transport channel parameters. Transport Format Combination Set (TFCS) indicates the allowed combinations of already defined Transport formats and the mapping between these allowed TFCs and the corresponding TFCI (Transport Format Combination Indicator) values. For TDD, different coded composite transport channels have independent transport format combination sets and thus independent TFCI values.
   a) UL Transport channel information common for all transport channels
      i) PRACH TFCS
      ii) CHOICE mode
         (1) FDD (TFC Subset; UL DCH TFCS)
         (2) TDD (UL TFCS Identity; UL TFCS; TFC Subset)
      iii) TFC subset list
   b) Added or Reconfigured UL TrCH information
      i) Uplink transport channel type
      ii) UL Transport channel identity
      iii) CHOICE UL parameters
         (1) DCH, USCH TFCS
         (2) E-DCH TFCS
   c) DL Transport channel information common for all transport channels
      i) SCCPCH TFCS
      ii) CHOICE mode
         (1) FDD—CHOICE DL parameters (Explicit TFCS or Same as UL)
         (2) TDD—Individual DL CCTrCH information—DL TFCS Identity; CHOICE DL parameters (Independent TFCS or Same as UL)
   d) Added or Reconfigured DL TrCH information
      i) DL channel type
      ii) DL Transport channel identity
      iii) CHOICE DL parameters (Explicit—TFCS; SameAsUL; HS-DSCH)
      iv) DCH quality target
3. Predefined Physical Channel configuration—This information element concerns a predefined configuration of physical channel parameters
   a) Uplink radio resources—Uplink DPCH Info
      i) Uplink DPCH power control info—Parameters used by UE to set DPCH initial output power and to use for closed-loop power control in FDD and parameters for uplink open loop power control in 3.84 Mcps TDD and 7.68 Mcps TDD
      ii) CHOICE mode
         (1) FDD—TFCI existence; Puncturing Limit
         (2) TDD—Common timeslot info
   b) Downlink radio resources—DL information common for all radio links
      i) CHOICE mode
         (1) FDD—Spreading factor—Integer (4, 8, 16, 32, 64, 128, 256, 512); Fixed or Flexible Position; TFCI existence
         (2) TDD—Common timeslot info Description of Threat Broadcasts of SYSTEM INFORMATION (and other information, such as measurement configurations) are not protected in UMTS. For example, network predefined configurations are broadcast in system information blocks type 16, which has multiple occurrences for each predefined configuration. Different parts of the system may provide the UE with one or more predefined UTRAN configurations, comprising radio bearer, transport channel and physical channel parameters. The UE should store all relevant IEs included in the system information block. The availability of predefined configurations is communicated to the network during the call establishment, and thus, if available, the network relies on this information instead of transmitting the complete configuration to the UE.

If an attacker can imitate the network behavior and broadcast a set of system information after UE switch on or enter new scope area, i.e. master information block, scheduling blocks and system information blocks having the same value tag and identities as in the current network, he can manage to send wrong configuration to the UE.

In other words, the attacker can send some wrong configuration parameters, e.g. wrong PhyCH or TrCH parameters like or spreading factor (SF) or Transport Format Combination Set (TFCS), which will be written under the same value tag and identity as in current network.

Furthermore, the attacker can indicate that the system information has changed by paging all UEs using unprotected PAGING TYPE 1 message (by including the value tag of the master information block in the IE "BCCH modification info" in the PAGING TYPE 1 message). Once all UEs have read the system information, the attacker can change back the value tag to the value tag of the real neighboring cells and this time introduce wrong system information, i.e. wrong predefined configuration parameters.

At call establishment, the configuration stored in the UE will be different from the configuration that the network supposes. The UE will apply the wrong configuration and the communication will be spoiled somehow or the UE will be detached from the network until the next switch off/switch on or entering of new scope area (next re-read of system information). The following scheduled broadcasts of system information by the network will be ignored by the UE due to the fact that the value tag and identities are the same.

Similar threats can be expected to other information that the UE uses based on the system information, e.g. measurement configurations broadcast on the system information etc. But this is less critical due to it is valid only for one cell.

Possible Solutions to Protect Broadcast Information

The solution against the above described threats can be based on the source origin authentication methods. In such methods, the message from the network contains such information basing on which the UE through some algorithm can verify whether the sending entity is as claimed, i.e. that the sending entity is indeed the network but not some non-trusted entity. In this way, the following methods are developed:

Source origin authentication using Signatures/PKI;
Source origin authentication schemes, such as TESLA.

Signatures/PKI

Public key cryptography is a form of cryptography which generally allows users to communicate securely without having prior access to a shared secret key. This is done by using a pair of cryptographic keys, designated as public key and private key, which are related mathematically. There are many forms of public key cryptography, including:

1) public key encryption—keeping a message secret from anyone that does not possess a specific private key.
2) public key digital signature—allowing anyone to verify that a message was created with a specific private key.
3) key agreement—generally, allowing two parties that may not initially share a secret key to agree on one.

Figure 2:
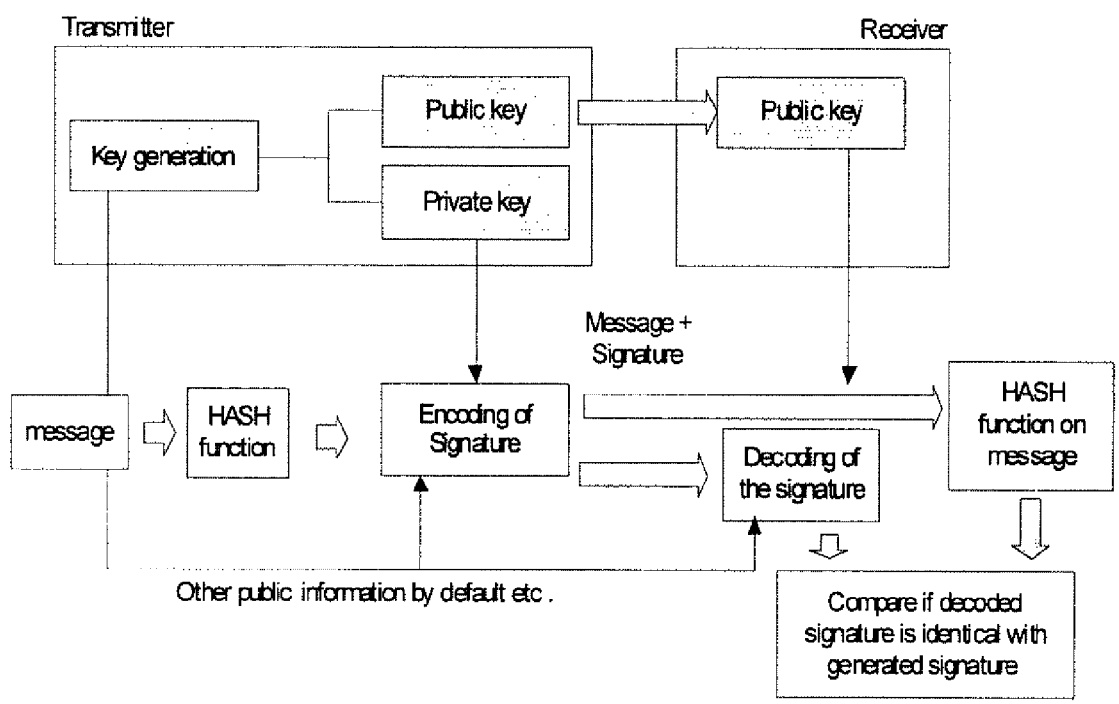
FIG. 2 shows an example of a public key digital signature.

FIG. 2 shows the example of a Public key digital signature. Another application of public key cryptography is the authentication of a message. In order to make sure that a message has been sent by the transmitter, the transmitter sends a public key via a secure connection to the receiver. The two step approach is used, where a first keyless algorithm is used in order to generate a signature of the message (typically called a HASH function) and a second algorithm using private and public keys is used that encrypts/decrypts the signature. The important feature of the HASH function is that it is very difficult to build a message for which the HASH function will create a given signature.

Here, it is understood that a hash function (algorithm) is a function that maps keys to integers, usually to get an even distribution on a smaller set of values. Specifically, a hash function (algorithm) H is a transformation that takes an input m and returns a fixed-size string, which is called the hash value h (that is, h=H(m)). Hash functions with just this property have a variety of general computational uses, but when employed in cryptography, the hash functions are usually chosen to have some additional properties. The basic requirements for a cryptographic hash function are as follows: the input can be of any length; the output has a fixed length; H(x) is relatively easy to compute for any given x; H(x) is one-way; and H(x) is collision-free.

When the sender wants to transmit a message to the receiver, it will calculate a signature (also called a MAC: purely symmetric cryptographic functions) based on the message, signed with a HASH function, the private key and other information that might have been sent to the receiver beforehand or that might be fixed in the algorithm. The transmitter sends then the signed message together with the MAC to the receiver. Using the public key received by the transmitter, the receiver can then check whether the signature has been created with the private key that is related to the public key or whether the signature has not been created with the private key. The private/public key encryption algorithm is then applied on the signature that is output by the HASH function. This possibility is shown in FIG. 2.

In general, many algorithms are available for public key encryption and signatures, e.g. DSA or RSA algorithms which are already used in IETF RFC 2459, or elliptic curves algorithm. They are also described in http://csrc.nist.gov/cryptval/dss.htm. Hash functions that can be used are generally known, and functions that are widely known are SHA-1, SHA-224, SHA-256, SHA-384, and SHA-512.

TESLA

TESLA (Timed Efficient Stream Loss-tolerant Authentication) is an efficient broadcast authentication protocol with low communication and computation overhead, which scales to large numbers of receivers, and tolerates packet loss. Despite using purely symmetric cryptographic functions (MAC functions), TESLA achieves asymmetric properties.

TESLA requires that the receivers are loosely time synchronized with the sender and also needs an efficient mechanism to authenticate keys at the receiver. TESLA is based on the principle of a so-called one-way chain.

Figure 3:
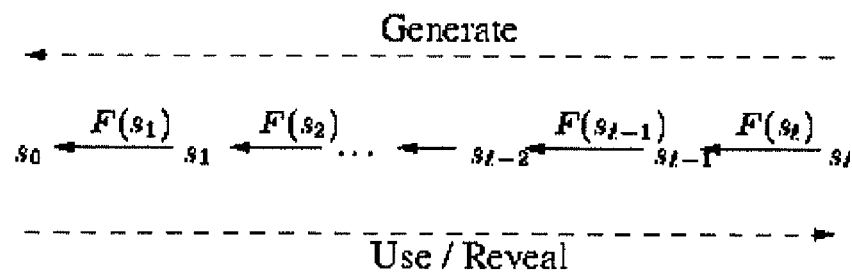
FIG. 3 shows an exemplary one-way chain construction.

One-way chains are a widely-used cryptographic primitive, FIG. 3 shows an exemplary one-way chain construction. To generate a chain of length, we randomly pick the last element of the chain S. The chain is generated by repeatedly applying a one-way function F. Finally, S0 is a commitment to the entire one-way chain, and we can verify any element of the chain through S0, e.g. to verify that element Si is indeed the element with index i of the hash chain, we check that Fi(Si)=S0. The chain can be created all at once and each element of the chain can be stored, or we can just store and compute any other element on demand.

As shown in FIG. 3 (i.e., one type of One-way chain example), the sender generates this chain by randomly selecting S and repeatedly applying the one-way function F. The sender then reveals the values in the opposite order.

A more detailed description on TESLA can be found in the TESLA Broadcast Authentication Protocol.

Problem Addressed

The mechanisms described in the background can solve the problem of protection of the broadcast signaling, but the implementation of these mechanisms is associated with a number of issues both for the vendors of user equipment and network equipment.

Regarding the issues related to PKI, the asymmetric algorithms (such as RSA) which is lying in the basis of PKI require very complex calculations on the receiver side and can slow down the device working performance, which can even be noticeable to a user. That is why improved methods applicable and user equipment with rather low-performance processors for wireless systems are needed to be developed.

The issues of using TESLA algorithm are mainly associated with IPR problems and also the problem of secure delivery of initial value from transmitting entity to receiving entity to start the one-way key chain should be solved. In this case the shared secret can be used.

The present invention solves the problem of mitigation the threats described above and proposes less complex (but reliable) countermeasures as PKI or TESLA-like.

Taking into account the complexity and issues related to implementation of the background art methods described above, the following countermeasures are proposed. These countermeasures are based on the capability of the receiver to interact with the sender, i.e. to communicate some information related to its existing system information before call establishment. These countermeasures may not be able to help against the first introduction of wrong system information by an attacker, but at least can identify that the system information is wrong, so that the UE can take appropriate actions to reconnect to the network.

In an exemplary embodiment of the present invention, the user equipment (UE) calculates a checksum (or other appropriate value) (using appropriate CRC or hash function or the like) on the received configuration every time when there is no stored configuration with the same identity/value tag.

In the first RRC Connection Request message (or some other type of appropriate message), the UE can send this checksum, so the RAN node can check whether the configuration is correct. In case that the UE has the wrong configuration, the network can instruct the UE to erase it and send the complete (proper) configuration, which it wants to use.

To prevent against repeated broadcast/sending of the same wrong configuration, the UE can store its current "wrong" checksum and for the next broadcast of system information compare the stored checksum with the new checksum, thus, if the checksums are equal—ignore the new configuration and if different—store the new configuration.

Also, to prevent against symmetrical introduction of wrong system information by the attacker (in case that the attacker potentially changed parameters of "wrong" system information which he broadcasts) in the following false RRC message, the UE should potentially be able to store more than one predefined configurations set under same identities (namely, received from the network and received from the attacker) during some small time interval.

In this case, if the UE has received two new configurations during this small time interval, it should store both and try to connect using the first one. In case that the connection using the first predefined configuration is failed, the UE can use another predefined configuration.

We assume that the attacker can dispose of hardware and software of different complexity which can fully imitate real Node B commands. Thus, he can intercept RRC commands sent from the UE and imitate RRC commands sent from Node B to the UE before the Security Mode Command.

In case of the threat related to broadcast of system information, the attacker can behave as follows:

1) Periodically broadcast wrong system information (predefined configurations) with similar parameters without interacting with the UE.

2) Periodically broadcast wrong system information (predefined configurations) with changed parameters without interacting with the UE.

3) Periodically broadcast wrong system information (predefined configurations) with changed parameters with interacting with the UE, i.e. response to RRC messages from the UE.

4) Periodically indicate that the system information has changed by paging all UEs using unprotected PAGING TYPE 1 message (by including the value tag of the master information block in the IE "BCCH modification info" in the PAGING TYPE 1 message) and introduce wrong system information (predefined configurations).

5) Periodically indicate that the system information has changed by paging all UEs using unprotected PAGING TYPE 1 message (by including the value tag of the master information block in the IE "BCCH modification info" in the PAGING TYPE 1 message) and introduce wrong system information (predefined configurations) with interacting with UE, etc.

The list can be expanded but since the benefits of such attacks are most of all related to a temporary spoil (disruption) of communication or DoS (Denial of Service) aspects and not associated with any theft of data, the motivation to mount such attacks with usage of complex and expensive hardware and software is questionable. Thus, a universal and inexpensive mechanism to mitigate the potential threat is needed.

The description of the proposed countermeasures follows below:

After the UE is switched on (or enters new PLMN), it reads broadcast of system information. If an attacker can imitate the network behavior and broadcast a set of system information, i.e. master information block, scheduling blocks and system information blocks having the same value tag and identities as in the current network, he can manage to send wrong configuration to the UE. Thus, wrong system information (wrong predefined configuration parameters) will be stored in the UE under the identities and value tags as in the current network and thus, the following scheduled broadcasts of system information by the network will be ignored by the UE.

At every reception of new system information when the identities and/or value tags differ from currently stored, the UE should calculate a checksum (or other value) on received system information. For this case, a simple CRC function may be used, for example CRC-16 or CRC-32. The purpose of this function is to be able to unambiguously distinguish between two different system information sets. CRC-32 or Adler-32 is more reliable that CRC-16, but it brings more signaling overhead. Since there is no integrity protection of broadcast signaling, the CRC or hash function should be as simple as possible just to provide the necessary feature.

Figure 4:
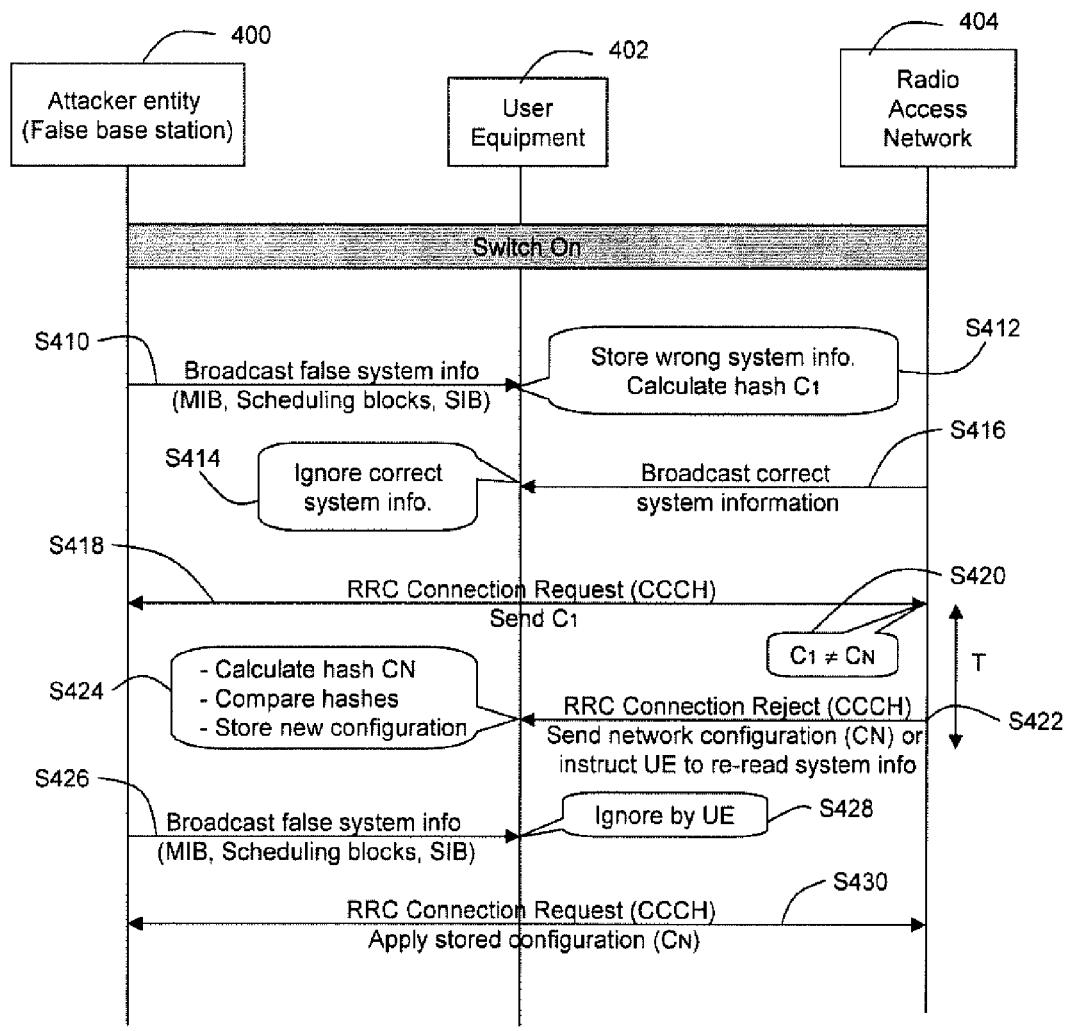
FIG. 4 shows an exemplary process of call establishment between the UE and the radio access network.

In FIG. 4, an exemplary process of call establishment between the UE and the radio access network is shown. Here, it is assumed that the UE does not have the current network predefined configuration, i.e. the value tags are different. Also, it is assumed that an attacker is masking under the network behavior and broadcasts the whole set of system information with some wrong physical or transport channel parameters. Once the attacker has managed to send its broadcast to the UE before the network broadcast, the wrong information will be written and the communication will be spoiled (i.e. corrupted).

In FIG. 4, it is assumed that the attacker equipment can not communicate with the UE and it can only broadcast a set of wrong system information periodically. The countermeasure is as follows:

1) The UE calculates the hash value on the predefined configuration sent in system information block type 16 when the value tag or identity in received information is different.

2) In the first RRC Connection Request after the receiving of new configuration, the UE sends hash value C1 to the network.

3) The network computes hash value using the same algorithm on the predefined configuration it wants to use (CN) and compares its hash value with the received hash value.

4) If C1=CN, then perform normal network action (send RRC Connection Setup message).

5) If C1≠CN, then send RRC Connection Reject Message with the correct network configuration set.

6) UE applies the received network configuration and sends RRC Connection Request message again.

The alternative way in this case (in this case the attack can be successful if the attacker can change some parameters of the wrong system information which he broadcasts, so the hash value do not match):

1) The UE calculates the hash value on the predefined configuration sent in system information block type 16 when the value tag or identity in received information is different.

2) The UE stores the calculated hash value (C1).

3) In the first RRC Connection Request after the receiving of new configuration, the UE sends hash value C1 to the network.

4) The network computes hash value using the same algorithm on the predefined configuration it wants to use (CN) and compares its hash value with the received hash value.

5) If C1=CN, then perform normal network action (send RRC Connection Setup message)

6) If C1≠CN, then send RRC Connection Reject Message with command to erase existing configuration.

7) For the next broadcast of system information the UE compares new and stored hashes and if they don't match— apply new configuration.

Figure 5:
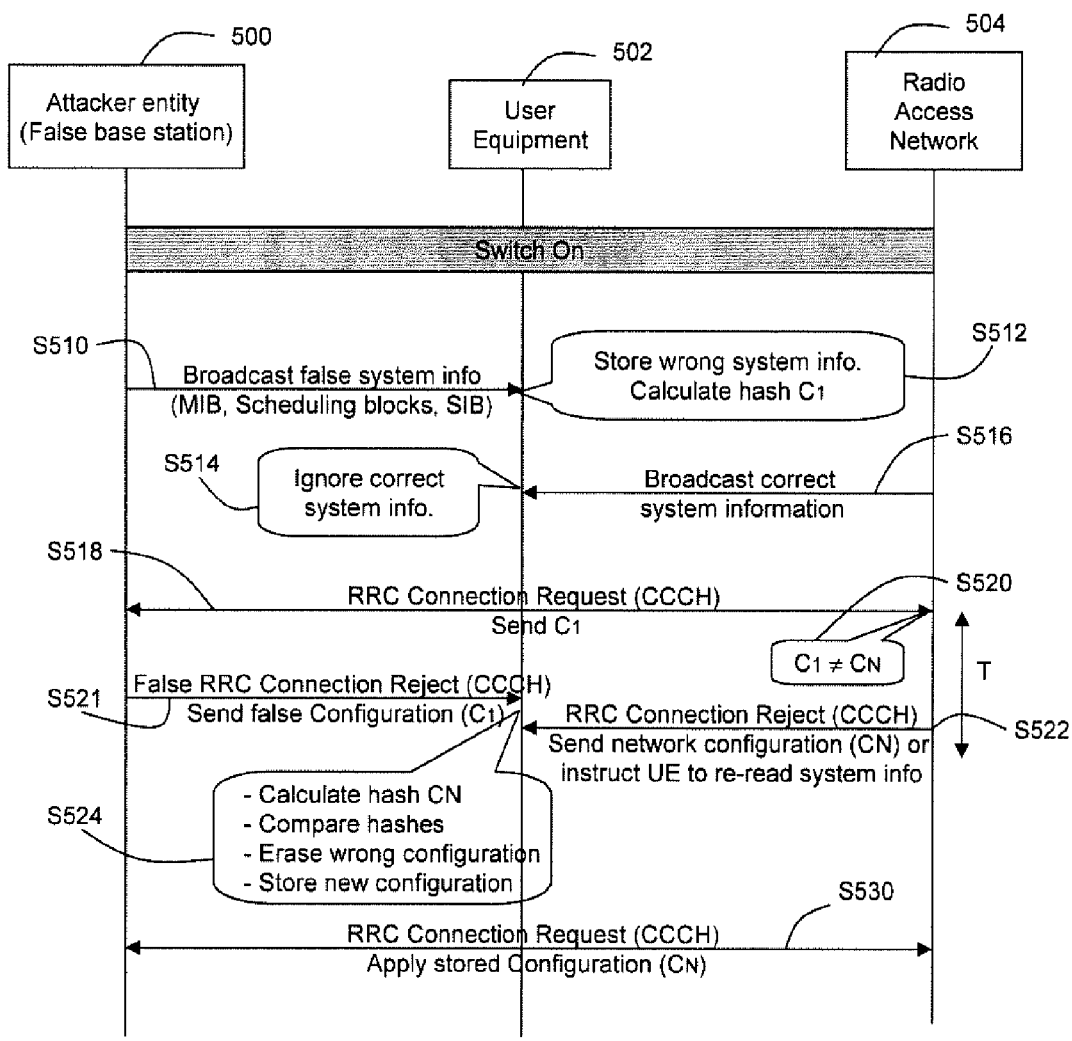
FIG. 5 shows another exemplary process of call establishment between the UE and the radio access network.
Figure 6:
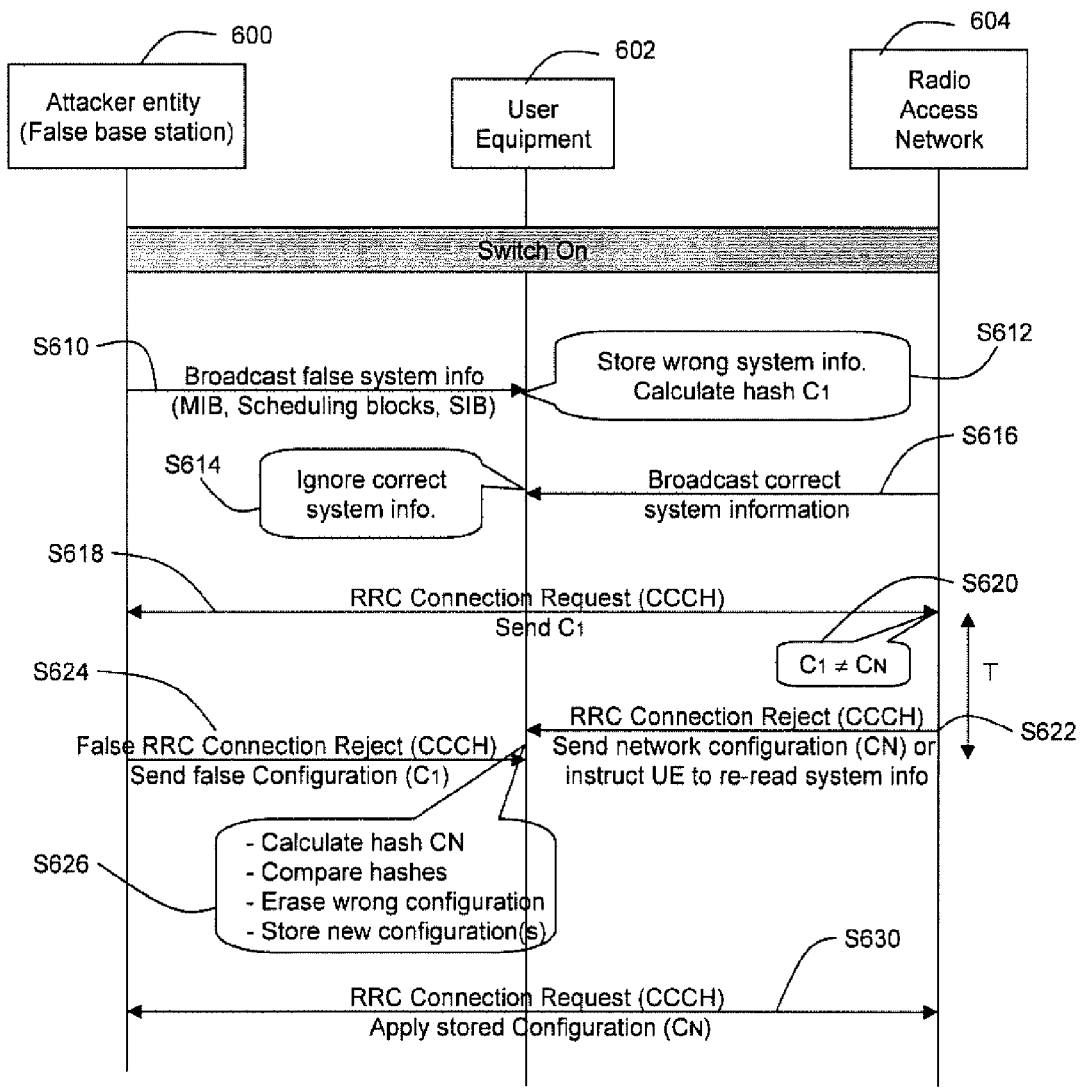
FIG. 6 shows yet another exemplary process of call establishment between the UE and the radio access network.
Figure 7:
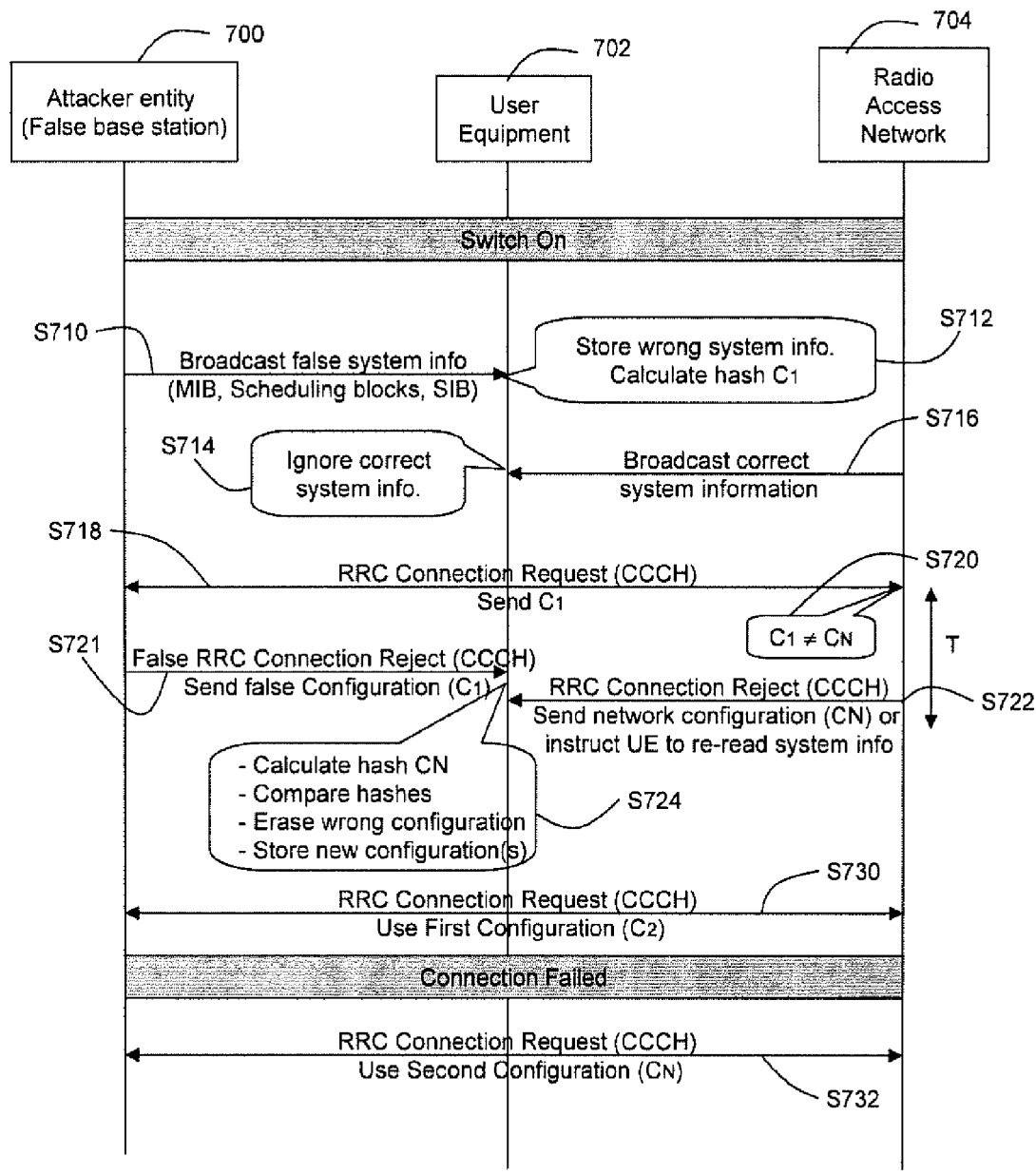
FIG. 7 shows a further exemplary process of call establishment between the UE and the radio access network.
Figure 8:
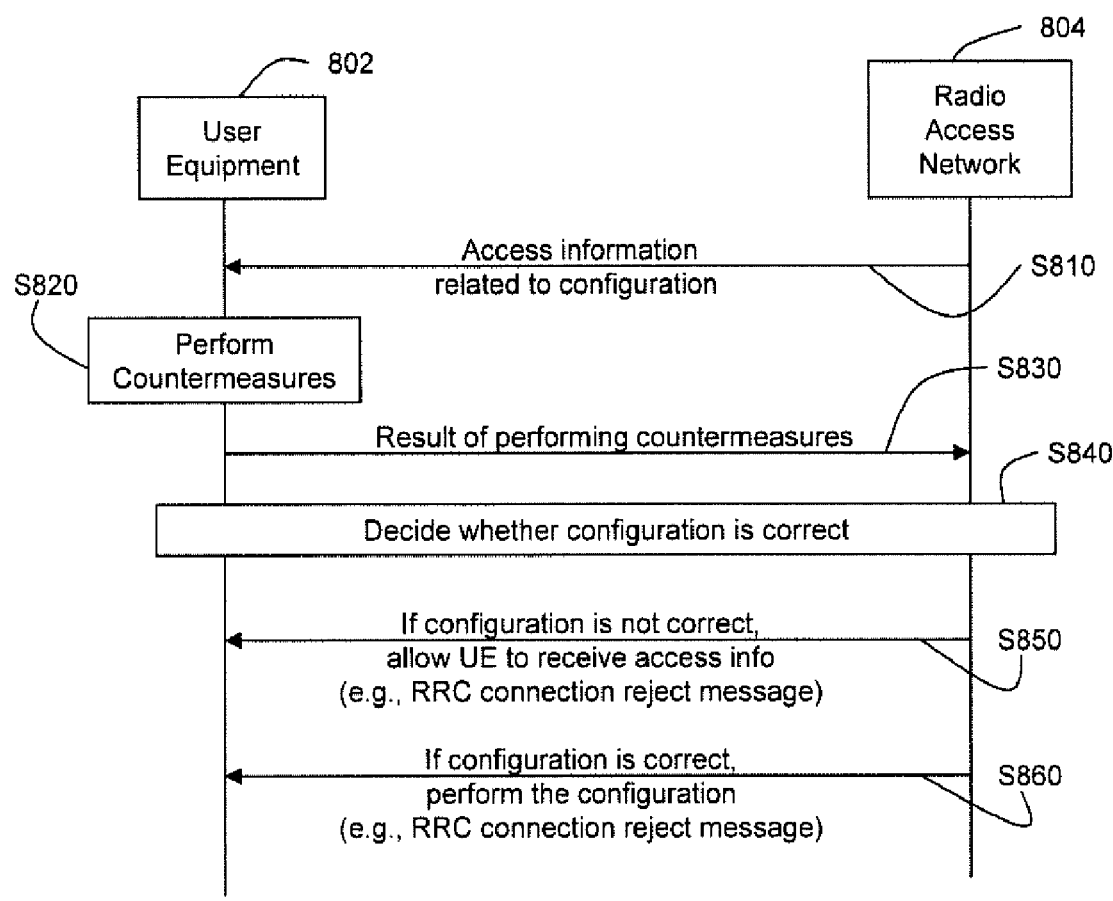
FIG. 8 shows an exemplary signal flow between the network and a terminal for performing countermeasures to protect access information in wireless communications.

In FIG. 5, it is assumed that the attacker equipment can communicate with the UE and can respond to its RRC signaling messages sent on CCCH before the security mode command, but it can not change the parameters for configuration which it broadcast. In FIG. 6 and FIG. 7, it is assumed that the attacker equipment can communicate with the UE and can respond to its RRC signaling messages sent on CCCH before the security mode command, and also it can change "wrong" parameters of system information which he broadcasts. The general countermeasure is as follows:

1) The UE calculates the hash value on the predefined configuration sent in system information block type 16 when the value tag or identity in received information is different.

2) The UE stores the calculated hash value (C1).

3) In the FIRST RRC Connection Request after the receiving of new configuration, the UE sends hash value C1 to the network.

4) The network computes hash value (CN) on the predefined configuration it wants to use using the same algorithm and compares its hash value with the received hash value.

5) If C1≠CN—network sends RRC Connection Reject Message with the correct network configuration set.

(a) The UE receives RRC Connection Reject Message with new configuration. The UE starts timer T. UE compares the hash value calculated on received configuration with the stored hash value and if they match—discard this message, if they do not match—apply new configuration (CN), as the first order.

(i) If the UE receives another RRC Connection Reject message with new configuration during the active timer T, the UE compares the hash value calculated on received configuration with the stored hash value and if they match—discard this message, if they do not match—erase the first configuration (C1) and store new configuration (C2), as the second order.

(ii) If the UE receives another message which is RRC Connection Setup message during the active timer T, use the first configuration (C1) as the second order.

6) If C1=CN—network acts normally, i.e. sends RRC Connection Setup message.

(a) If the UE receives RRC Connection Setup message. The UE starts timer T The UE act normally, i.e. sends RRC Connection Setup Complete message to the network.

(i) If the UE receives RRC Connection Reject message with new configuration during the active timer T, the UE compares the hash value calculated on received configuration with the stored hash value and if they match—discard this message, if they do not match—and store new configuration (C2), as the second order.

7) UE applies first the first stored network configuration and sends RRC Connection Request message again.

8) If the communication with the networks fails or is spoiled somehow, the UE applies the second configuration.

The time for the timer T should be very small, about the one period between sending/receiving of RRC connection messages.

These countermeasures are not totally bullet-proof against the DoS attacks, since the attacker can program its equipment to trick the UE to use "wrong" configuration in first order, because there is no source origin authentication. But the UE can use the correct configuration after determining that the service is failed.

Also the benefits for the attacker are questionable since, the DoS of certain UEs is not related to any theft of valuable data or theft of service, and mounting these attacks is concerned with using complex and expensive hardware and software which can interact with the UE via RRC messages. Also the percent of successful attacks is about 50% since it is unknown which message will be received by the UE first after the FIRST "check" RRC message after receiving new configuration—the correct message or the false message.

Since this algorithm is not very difficult for realization in UE and in the network and not associated with significant signaling and processing overhead, and is only activated when the network identifies that the UE uses incorrect configuration, this is suitable to implement in the Long-Term Evolved (LTE) Radio Access Networks, as it raises the overall level of security of the system before the establishment of the Security Mode.

The aspects and features of the present invention can be used for protection of broadcast signaling sent before the Security Mode Command in UMTS Terrestrial Radio Access Networks (UTRAN) an in Long-Term Evolved Radio Access Networks (LTE RAN) as well as in other networks which use unprotected broadcasts of system information needed for call establishment.

The aspects and features of the present invention may be summarized in the following manner:

1. The Method for mitigation of threat, which can end in DoS attack or communication spoil, associated with unprotected sending of system information from network to user equipment (UE) in point-to-multipoint fashion. The system information carries some essential configuration parameters for connection setup and different configuration sets are distinguished by certain value tags and identities.

The method comprising the steps of:

1) The UE calculates the hash value (C1) using hash function on the received configuration sent in system information when the value tag or identity in received information is different. Here, the value tag may be indicated by means of a bit (0 or 1) while the identity may be indicated by a sequence number (SN) or the like.

2) In the first connection request message after the receiving of new configuration the UE sends hash value C1 to the network.

3) The network computes hash value using the same hash function on the predefined configuration it wants to use (CN) and compares its hash value with the received hash value.

4) If C1=CN, networks sends connection setup message to the UE

5) If C1≠CN, network sends connection reject message with the correct network configuration set.

6) UE applies the received network configuration and sends connection request message again without hash value of current configuration.

2. The Method for mitigation of threat, which can end in DoS attack or communication spoil, associated with unprotected sending of system information from network to user equipment (UE) in point-to-multipoint fashion. The system information carries some essential configuration parameters for connection setup and different configuration sets are distinguished by certain value tags and identities.

The method comprising the steps of:

1) The UE calculates the hash value (C1) using hash function on the received configuration sent in system information when the value tag or identity in received information is different. Here, the value tag may be indicated by means of a bit (0 or 1), while the identity may be indicated by a sequence number (SN) or the like.

2) In the first connection request message after the receiving of new configuration the UE sends hash value C1 to the network.

3) The network computes hash value using the same hash function on the predefined configuration it wants to use (CN) and compares its hash value with the received hash value.

4) If C1=CN, networks sends connection setup message to the UE

5) If C1≠CN network sends connection reject message with command to erase existing configuration.

6) For the next broadcast of system information the UE calculates hash value on the new configuration and compares new and stored hash values and a) If they match—discard this message b) if they do not match—apply new configuration.

3. The Method for mitigation of threat, which can end in DoS attack or communication spoil, associated with unprotected sending of system information from network to user equipment (UE) in point-to-multipoint fashion. The system information carries some essential configuration parameters for connection setup and different configuration sets are distinguished by certain value tags and identities.

The method comprising the steps of:

1) The UE calculates the hash value (C1) using hash function on the received configuration sent in system information when the value tag or identity in received information is different. Here, the value tag may be indicated by means of a bit (0 or 1), while the identity may be indicated by a sequence number (SN) or the like.

2) In the first connection request message after the receiving of new configuration the UE sends hash value C1 to the network.

3) The network computes hash value using the same hash function on the predefined configuration it wants to use (CN) and compares its hash value with the received hash value.

(1) If C1≠CN—network sends connection reject message with the correct network configuration set to the UE.

(a) The UE receives connection reject message with new configuration.
    i) The UE starts timer T
    ii) UE compares the hash value calculated on received configuration with the stored hash value
      (1) if they match—discard this message,
      (2) if they do not match—apply new configuration (CN), as the first order.
    iii) If the UE receives another connection reject message with new configuration during the active timer T, the UE compares the hash value calculated on received configuration with the stored hash value
      (1) if they match—discard this message,
      (2) if they do not match—erase the first configuration (C1) and store new configuration (C2), as the second order.
    iv) If the UE receives another message which is connection setup message during the active timer T, use the first configuration (C1) as the second order.
  (b) UE applies first the first order network configuration and sends RRC Connection Request message again.

(2) If C1=CN—network acts normally, i.e. sends connection setup message.

(a) If the UE receives connection setup message.
    i) The UE starts timer T.
    ii) The UE acts normally, i.e. sends connection setup complete message to the network and applies the stored configuration as the first order.
    iii) If the UE receives connection reject message with new configuration during the active timer T, the UE compares the hash value calculated on received configuration with the stored hash value and
      (1) if they match—discard this message,
      (2) if they do not match—store new configuration (C2), as the second order.

(3) If the communication with the networks fails or is spoiled somehow, the UE applies the second order configuration.

The time for the timer T should be very small, about the one period between sending/receiving of signaling messages between the network and the UE.

The description of threat and countermeasures were included into main document on LTE/SAE Security called Rationale and track of security decisions in LTE RAN/3GPP SAE. The aspects and features described herein are related to the following reference documents: 3GPP TS 25.331 v.7.0.0 Radio Resource Control (RRC) protocol specification; 3GPP TS 33.102 v.7.0.0 3G Security Architecture; 3GPP TS 21.905 v.7.2.0 Vocabulary for 3SPP Specifications; and A. Perrig, R. Canetti, J. D. Tygar, D. Song TESLA Broadcast Authentication Protocol (http://www.ece.cmu.edu/~adrian/projects/tesla-cryptobytes/paper/paper.html).

The present invention provides a method of protecting access information, to the method comprising: receiving access information related to configuration, the access information being broadcast from a network; performing a countermeasure procedure using the received access information; and transmitting a result of the performed countermeasure procedure to the network.

The access information may be predefined between the network and mobile terminals. The access information may include system information. The access information may include information regarding at least one of downlink and uplink mapping (DL/UL-MAP). The countermeasure procedure may involve the use of a checksum calculation. A result of the checksum calculation may be a hash value. The checksum calculation may employ a cyclic redundancy check/code (CRC) or a hash function. The result may be included in a RRC connection request message or another type of access request message. The method may further comprise: performing configuration according to the result of the performed countermeasure procedure. Configuration may be performed upon receiving access information from the network or receiving an instruction from the network to re-read access information. The performing and transmitting steps may comprise: generating a terminal-computed configuration based on the received access information; sending a first access request message to the network together with the terminal-computed configuration; and operating a timer to provide a time period during which reception of an access rejection message is possible. The method, after the operating step, may further comprise: receiving an access reject message from the network together with a network-computed configuration; comparing the received network-computed configuration with the terminal-computed configuration; storing the received network-computed configuration according to the comparing; ignoring subsequently received access information, if any; and sending a second access request message to the network upon applying the stored network-computed configuration to perform configuration with the network. The method, after the operating step, may further comprise: receiving a first access reject message from a first network together with a first network-computed configuration; receiving a second access reject message from a second network together with a second network-computed configuration; comparing the received first and second network-computed configurations with the terminal-computed configuration; storing one received network-computed configuration determined to be correct according to the comparing, and erasing the other received network-computed configuration determined to be incorrect according to the comparing; and sending a second access request message to the network upon applying the stored network-computed configuration to perform configuration with the network. The method, after the operating step, may further comprise: receiving two or more access reject messages from two or more networks together with two or more network-computed configurations; comparing the received two or more network-computed configurations with the terminal-computed configuration; storing two or more received network-computed configurations determined to be correct according to the comparing, and erasing any received network-computed configurations determined to be incorrect according to the comparing; sending another access request message to the network upon applying one of the stored network-computed configurations to perform configuration with the network; and if the performed configuration fails, sending an additional access request message to the network upon applying another one of the stored network-computed configurations to perform configuration with the network.

Also, the present invention provides a method of protecting access information, the method comprising: broadcasting access information related to configuration to a terminal; receiving a result of a countermeasure procedure performed by the terminal; deciding whether the configuration is correct or incorrect based on the received result; and if the configuration is incorrect, allowing the terminal to receive access information.

The method may further comprise: if the configuration is correct, performing the configuration. The configuration may be performed by transmitting a RRC connection set-up message or another type of connection set-up message. The access information may include system information. The result may be included in a RRC connection request message or another type of access request message. The allowing step refers to sending access information to the terminal or instructing the terminal to re-read access information. Information related to the sending system information or instructing the terminal to re-read system information may be included in a RRC connection reject message or another type of access reject message.

Additionally, the present invention provides a mobile terminal that performs a method of protecting access information, the terminal comprising: means to receive access information related to configuration, the access information being broadcast from a network; means to perform a countermeasure procedure using the received access information; and means to transmit a result of the performed countermeasure procedure to the network.

Furthermore, the present invention provides a network for performing method of protecting access information, the network comprising: means to broadcast access information related to configuration to a terminal; means to receive a result of a countermeasure procedure performed by the terminal; and means to decide whether the configuration is correct or incorrect based on the received result, and if the configuration is incorrect, allowing the terminal to receive access information.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system. The present invention is also applicable to other wireless communication systems using different air interfaces and/or physical layers, for example, TDMA, CDMA, FDMA, WCDMA, broadband wireless air interface techniques, so-called 3.5G or 4G systems designed to provide higher data rates and IP-based data services, etc.) and/or various communication standards (such as, but not limited to, 3GPP (and its enhancements referred to as LTE), UMTS, OFDM, OFDMA, IEEE 802.16, IEEE 802.20, etc.). As such, at least some of the features described herein are applicable to such standards that have been developed or that are continuing to evolve.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of protecting access information, the method comprising:
   receiving access information related to a configuration, the access information being broadcast from a network;
   performing a countermeasure procedure using the received access information; and
   transmitting a result of the performed countermeasure procedure to the network,
   wherein the performing and transmitting steps further comprise:
      generating a terminal-computed configuration based on the received access information, and
      sending a first access request message to the network together with the terminal-computed configuration.

2. The method of claim 1, wherein the access information is predefined between the network and mobile terminals.

3. The method of claim 1, wherein the access information includes system information.

4. The method of claim 1, wherein the access information includes information regarding at least one of downlink and uplink mapping (DL/UL-MAP).

5. The method of claim 1, wherein the result of the performed countermeasure procedure is included in an RRC connection request message or another type of access request message.

6. The method of claim 1, wherein after transmitting the result of the performed countermeasure procedure, the method further comprises:
   receiving an access reject message from the network together with a network-computed configuration;
   comparing the received network-computed configuration with the terminal-computed configuration;
   storing the received network-computed configuration according to the comparison;
   ignoring subsequently received access information, if any; and sending a second access request message to the network upon applying the stored network-computed configuration to perform the configuration with the network.

7. The method of claim 1, wherein after transmitting the result of the performed countermeasure procedure, the method further comprises:
receiving a first access reject message from a first network together with a first network-computed configuration;
receiving a second access reject message from a second network together with a second network-computed configuration;
comparing the received first and second network-computed configurations with the terminal-computed configuration;
storing one received network-computed configuration determined to be correct according to the comparison, and erasing the other received network-computed configuration determined to be incorrect according to the comparison; and
sending a second access request message to the network upon applying the stored network-computed configuration to perform configuration with the network.

8. The method of claim 1, wherein after transmitting the result of the performed countermeasure procedure, the method further comprises:
receiving two or more access reject messages from two or more networks together with two or more network-computed configurations;
comparing the received two or more network-computed configurations with the terminal-computed configuration;
storing two or more received network-computed configurations determined to be correct according to the comparison, and erasing any received network-computed configurations determined to be incorrect according to the comparison;
sending another access request message to the network upon applying one of the stored network-computed configurations to perform configuration with the network; and
sending an additional access request message to the network upon applying another one of the stored network-computed configurations to perform configuration with the network if the performed configuration fails.

9. The method of claim 1, further comprising performing the configuration according to the result of the performed countermeasure procedure.

10. The method of claim 9, wherein the configuration is performed upon receiving access information from the network or receiving an instruction from the network to re-read access information.

11. The method of claim 1, wherein the countermeasure procedure involves use of a checksum calculation.

12. The method of claim 11, wherein a result of the checksum calculation is a hash value.

13. The method of claim 12, wherein the checksum calculation employs a cyclic redundancy check/code (CRC) or a hash function.

14. A method of protecting access information, the method comprising:
broadcasting access information related to a configuration to a terminal;
receiving a result of a countermeasure procedure performed by the terminal;
deciding whether the configuration is correct or incorrect based on the received result; and
allowing the terminal to receive the access information if the configuration is incorrect.

15. The method of claim 14, wherein the access information includes system information.

16. The method of claim 14, wherein the result is included in an RRC connection request message or another type of access request message.

17. The method of claim 14, further comprising performing the configuration if the configuration is correct.

18. The method of claim 17, wherein the configuration is performed by transmitting an RRC connection set-up message or another type of connection set-up message.

19. The method of claim 14, wherein allowing the terminal to receive the access information refers to sending access information to the terminal or instructing the terminal to re-read access information.

20. The method of claim 19, wherein information related to the sending access information or instructing the terminal to re-read access information is included in an RRC connection reject message or another type of access reject message.

21. A mobile terminal that performs a method of protecting access information, the mobile terminal comprising:
means to receive access information related to a configuration, the access information being broadcast from a network;
means to perform a countermeasure procedure using the received access information; and
means to transmit a result of the performed countermeasure procedure to the network,
wherein the means to perform and transmit further comprises:
means to generate a terminal-computed configuration based on the received access information, and
means to send a first access request message to the network together with the terminal-computed configuration.

22. A network for performing a method of protecting access information, the network comprising:
means to broadcast access information related to a configuration to a terminal;
means to receive a result of a countermeasure procedure performed by the terminal; and
means to decide whether the configuration is correct or incorrect based on the received result, and allowing the terminal to receive access information if the configuration is incorrect.

* * * * *